United States Patent
Tripodi

[11] 3,835,504
[45] Sept. 17, 1974

[54] ELECTRIC FISH SCALER
[76] Inventor: Theodore Tripodi, 5 East St., Riverhead, N.Y. 11901
[22] Filed: June 14, 1973
[21] Appl. No.: 370,174

[52] U.S. Cl. .................................................. 17/66
[51] Int. Cl. ............................................ A22c 25/02
[58] Field of Search ........................... 17/64, 66–69

[56] References Cited
UNITED STATES PATENTS
3,670,364  6/1972  Bradley .................................. 17/66

*Primary Examiner*—Robert Peshock

[57] ABSTRACT

An electric fish scaler having a pair of fulcrum type arms with a slotted cam follower surface at one end being actuated by an eccentric cam. One arm carries a scale removing blade at its free end. The second arm is similarly actuated for stabilizing the scaler during cutting and causing it to move in steps between cutting operations.

2 Claims, 3 Drawing Figures

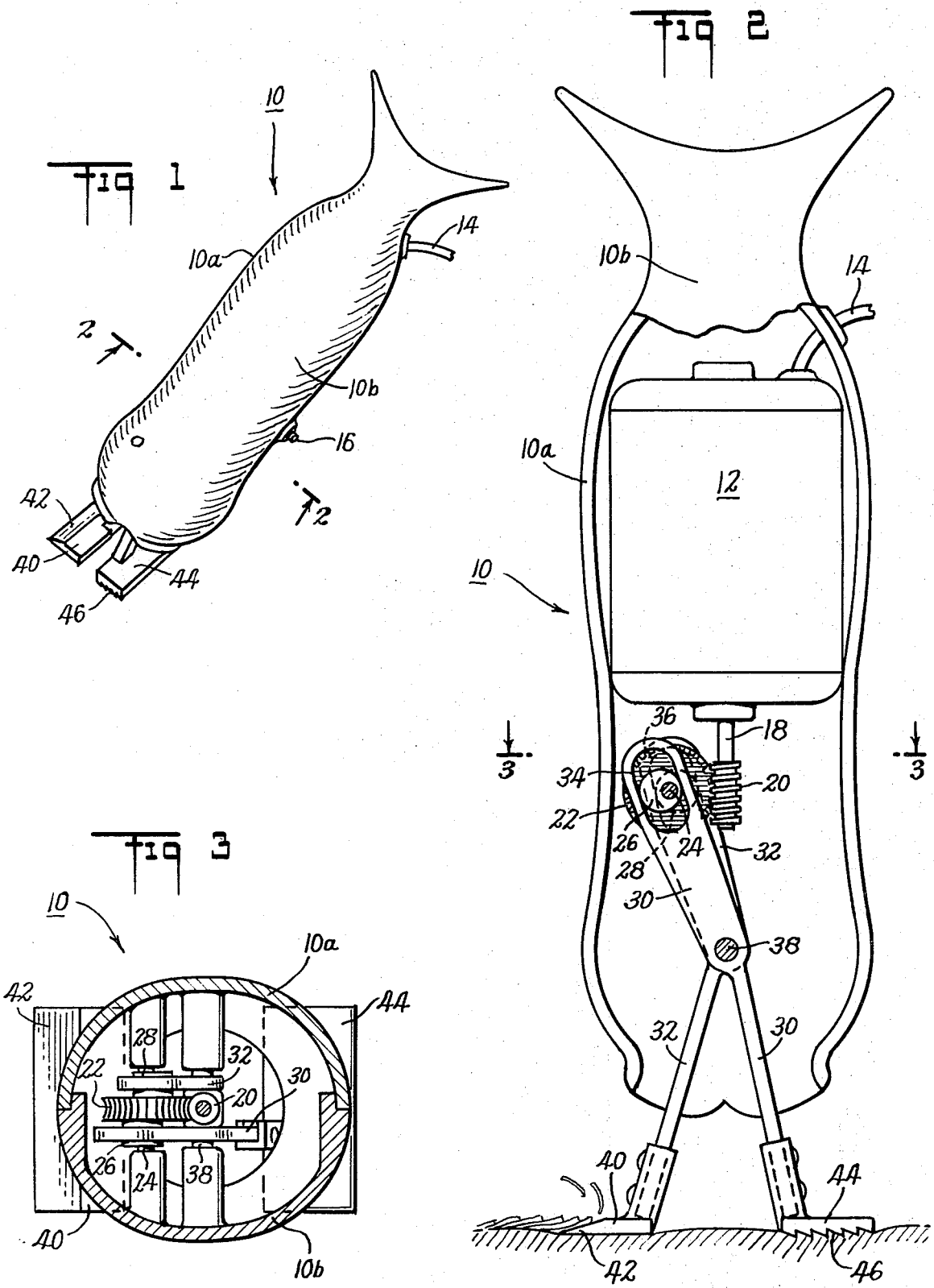

ELECTRIC FISH SCALER

The invention relates to fish scaling devices which are intended to be employed to facilitate the removal of scales from fish.

The present device provides a pair of cooperative elements for cutting and impelling the device over the body of a fish in contrast to the mere scale cutter of prior devices. See, for example, U.S. Pat. No. 3,670,364. The blade and impeller in the present case are disposed at the terminal portions of members which are driven by rotary cams generally as taught by U.S. Pat. No. 2,434,308. However, differing from the patented devices, the scale removing blade and impeller shoe are oppositely disposed for cutting the scales from the fish and moving the device after each cut. According to the invention, the scaler provides a cutting and an impelling operation for each revolution of their driving cam members and thus provides enhanced convenience and assured efficiency in terms of operation and performance.

One object of the invention is to provide a fish scaler of relatively economical manufacture which yet is capable of convenient handling and efficient performance.

Other objects and advantages of the invention may be appreciated on reading the following description of one embodiment thereof which is taken in conjunction with the accompanying drawings, in which:

FIG. 1 is a perspective view of the instant invention;

FIG. 2 is a vertical longitudinal sectional view showing the operating components of the improved fish scaler and taken on the line 2—2 of FIG. 1; and FIG. 3 is a cross section showing the driving means and is taken on the line 3—3 of FIG. 2.

Referring to the drawings, the principal operating components of the present fish scaler are housed in body 10, which is made up of two half portions 10a and 10b, and is shaped to be comfortably grasped by the hand of the user. Within the top portion of the body itself, as best seen in FIG. 2, is an electric motor 12 adapted to be connected to a power source by cord 14 through on-off switch 16.

Mounted on driving shaft 18 of the motor 12 is a worm 20 to drive worm gear 22 on its shaft 24 at a low rate of speed. Extending on each side and integral therewith are eccentric cams 26 and 28 oppositely oriented to impart a scissor-like action to a pair of fulcrumed arms 30 and 32 having cam follower slots 34 and 36 at their upper ends to engage the eccentric cams 26 and 28. Arms 30 and 32 are fulcrumed on shaft 38.

The lower end of arm 32 carries a replaceable scale removing blade 40 having a forwardly extending knife edge 42 for scraping the scales from the fish. The lower end of arm 30 carries a replaceable shoe 44 oriented rearwardly and having a serrated or sawtooth bottom 46 to grip the skin of the fish thus holding the fish scaler stationary while the blade 40 with its knife edge 42 moved forwardly to scrape off the scales.

It may be seen that in operation the operative strokes of the arms 30 and 32 are sequential with oppositely disposed terminal portions performing their respective functions once for every revolution. That is, after each cutting stroke of the knife edge 42 the blade 40 and the shoe 44 are retracted on one half cycle whereupon the blade 40 on the succeeding half cycle will make a second cutting stroke in a contiguous area on the body of the fish while the shoe 44 remains stationary and in gripping relation in its retracted position with the body.

Various modifications of the present invention may be effected by persons skilled in the art without departing from the scope and principle thereof as defined in the appended claims.

What is claimed is:

1. An electric fish scaler comprising a motor, a pair of oppositely oriented eccentric cams in driven connection with said motor, a pair of fulcrum mounted arms engaging said cams being actuated in a scissor-like manner separately and sequential thereby and having respectively a terminal knife edge and shoe member at the free ends thereof.

2. An electric fish scaler as defined in claim 1 wherein said knife edge and shoe are oppositely oriented.

* * * * *